July 6, 1965  V. C. SMITH  3,193,131
LIQUID STORAGE CONTAINER
Filed May 14, 1962
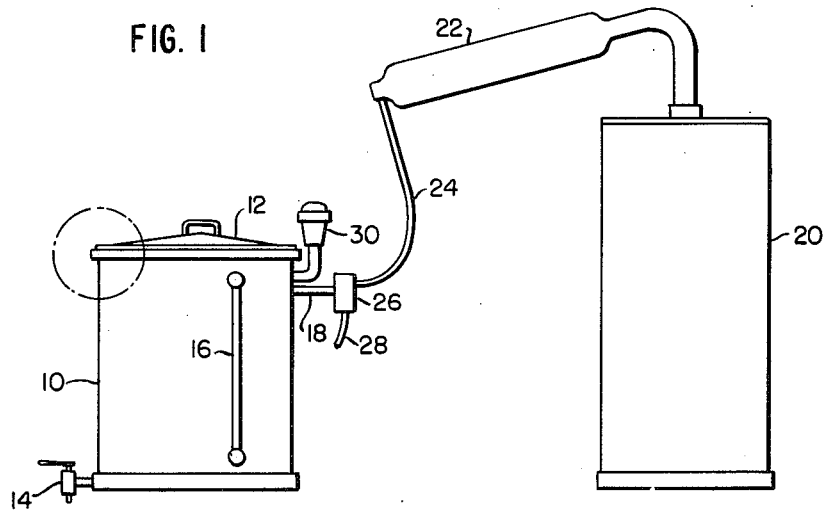
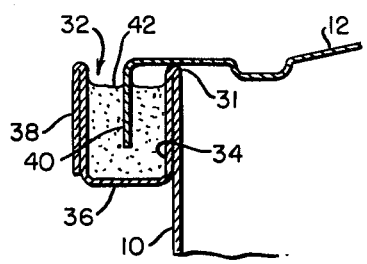
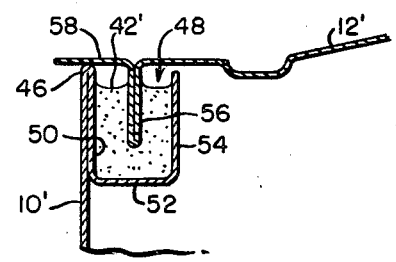
INVENTOR.
VERITY C. SMITH
BY
Kenway, Jenney + Hildreth
ATTORNEYS

United States Patent Office 3,193,131
Patented July 6, 1965

3,193,131
LIQUID STORAGE CONTAINER
Verity C. Smith, Dedham, Mass., assignor to Barnstead Still and Sterilizer Co., Boston, Mass., a corporation of Massachusetts
Filed May 14, 1962, Ser. No. 194,374
4 Claims. (Cl. 220—45)

This invention relates to the storage of fluids, and particularly to storage associated with a closed system in which the pressure of the fluid in storage may fluctuate.

It is common practice to provide a storage container comprising a vessel and a cover or closure which is rendered gas-tight by providing a trough of liquid about the opening at the upper end of the vessel. The periphery of the cover dips into the liquid mass in the trough. Such a container however is not well adapted for the storage of fluids under the conditions of fluctuating pressure within the container, as such fluctuations may disrupt the seal. It then becomes necessary to provide a trough sufficiently deep to establish a head of liquid at the seal of no less than the maximum pressure differential encountered. Where the interior of the vessel comes under a partial vacuum, there is also the possibility of fluid from the sealing channel entering the vessel and contaminating its contents. This simple and effective mode of sealing, has accordingly had only limited application.

The present invention provides a fluid-tight closure seal capable of withstanding abrupt pressure changes without disruption of the sealant fluid, while providing all of the tightness to be had in a seal of this type.

The requirements for a seal construction providing both impervious sealing and ability to withstand pressure fluctuations are somewhat contradictory. For best seal tightness, a sealing medium having fluid characteristics, by which the flow is directly proportional to the applied pressure, is necessary in order that all possible channels or openings between the cover and container are filled. A more rigid medium, however, is needed if the fluid is to be kept in place without disruption by pressure changes. A viscous fluid may be used with some benefit, but it will flow from the seal if a sufficient pressure differential is maintained for a sufficient length of time. A plastic medium presents better resistance to flow, but lacks the fluid characteristics necessary for proper sealing.

The present invention is based on the discovery that adequate fluid sealing characteristics may be combined with resistance to flow under a pressure by employing dilatant silicone putty as the sealing medium. Silicone putty, heretofore commonly available as "Silly Putty," behaves as a fluid of relatively high viscosity when at rest under no force tending to cause flow, but becomes increasingly rigid and solid when subjected to a force tending to induce strain. Thus, in a seal of this type, under quiescent conditions the silicone putty fills the trough about the open end of the vessel, and flows into complete and wetting contact with the cover flange. However, under a pressure differential, as may occur for instance when liquid is added to or withdrawn from the container, a resistance to flow develops which maintains the putty within the channel. In case a displacing force is applied with extreme rapidity, such as where the cover serves as an explosion panel, the silicone putty will become substantially rigid, without adhering to the cover flange, and will permit the cover to blow off without carrying the putty with it.

While the specification concludes with claims particularly pointing out the subject matter which is regarded as my invention, it is believed that a clearer understanding may be gained from the following detailed description of preferred embodiments thereof, referring to the accompanying drawing, in which:

FIG. 1 is a view in elevation of a water purification still, together with a storage container according to a preferred embodiment of the invention;

FIG. 2 is an enlarged sectional view showing fragmentary portions of the container and cover indicated by the area within the dashed circle in FIG. 1; and FIG. 3 is an enlarged sectional view of fragmentary portions of a container and cover of a modified form.

Referring to FIG. 1, the invention is shown incorporated in a liquid storage container including a vessel 10, which is generally of a conventional type, and cooperates with a removable cover 12. The vessel 10 is provided with a drain cock 14, a liquid level sight gage 16, and an inlet pipe 18. The container is shown in a typical application, being arranged to receive distilled water from a still 20, through a condenser 22 discharging to a delivery tube 24. The tube 24 is arranged in fluid-flow communication with the inlet pipe 18 through a water seal 26 of a conventional type, having a drain tube 28. An air vent 30 is provided to admit purified filtered air into the container 10 for replacing fluid withdrawn therefrom, and is preferably of a type disclosed by United States Patent No. 2,703,153, issued March 1, 1955 to W. H. Revoir, Jr. et al., and entitled "Air Filter."

Referring now also to FIG. 2, which shows on an enlarged scale the manner of cooperation of the vessel 10 with the cover 12, the vessel is provided peripherally about its open upper end 31 with an upwardly opening trough 32, formed by a reverse-bend flange 34, a radial flange 36, and a second reverse-bend flange 38. The trough 32 is arranged to receive a peripheral flange 40 formed about the cover 12.

According to the invention, a mass 42 of dilatant silicone putty is disposed within the trough 32, so that the cover flange 40 is received therein to seal the container against liquid and gaseous flow relation with the atmosphere. Dilitant silicone putty is available commercially from the General Electric Company under the designation SS–91 silicone, and is also available in novelty shops under the popular name "Silly Putty." This material is characterized by increased viscosity and resistance to flow when it is subjected to forces tending to induce flow or strain. Under normal conditions of substantially equal pressure exteriorly and interiorly of the container, the mass of putty 42 flows readily to either side of the container flange 40 to fill the volume of the trough uniformly and provide an effective seal against contamination or leakage of the water or other fluid stored in the container. However, when a differential pressure arises between the exterior and interior of the container, as may occur momentarily when liquid is withdrawn by opening the cock 14, the putty develops a resistance to flow which is effective to maintain it in place within the trough, thus preserving the seal. Large pressure differentials do not arise rapidly in the ordinary use of water stills or the like, in which the invention finds primary application; however, in any environment in which the putty is subjected to a rapid increase in pressure, it will quickly reach a substantially rigid state such as to firmly resist flow from the trough, even though the cover may be blown off.

Referring now to FIG. 3, a modification is shown in which a vessel 10′ is formed about its interior surface adjacent an upper open end 46 with a peripheral trough 48, between a reverse-bend flange 50, an inwardly-extending radial flange 52, and an upwardly-extending flange 54. A cover member 12′ is, in this case, provided with a peripherally-extending reverse-bend flange 56 which extends downwardly into the trough in the assembled relation of the parts, and terminates outwardly in a radial flange 58 for abutment on the upper end 46 of the vessel. Again, a mass of silicone putty 42′ is inserted in the trough 48, and behaves in combination with the cover and the vessel in a fashion similar to that of the embodiment of FIGS. 1 and 2. In this instance, however, the putty is fully enclosed within the container assembly when the cover is applied, and so is protected against the accumulation of dust and foreign matter from the atmosphere.

While preferred embodiments of the invention have been shown and described by way of illustration, it will be understood that various changes and modifications may readily occur to those skilled in the art without departing from the true spirit and scope of the invention, which I therefore intend to define in the appended claims without limitation to details of the illustrated embodiments.

What I claim is:

1. A liquid storage container comprising, in combination: a vessel for containing a liquid, said vessel having an open upper end and being formed peripherally about said upper end with an upwardly-open trough, a cover for overlying and enclosing said upper end, said cover being formed with a peripheral flange arranged to extend about the periphery of said open end and downwardly into said trough, and a mass of dilatant silicone putty disposed in said trough for submersion of said peripheral flange of said cover therein, said mass of silicone putty being characterized by flowing under quiescent conditions into complete and wetting contact with said cover flange, and becoming of increased resistance to flow and stiffness when subjected to force, thereby providing a liquid seal about said cover which stiffens to withstand sudden fluctuations in the differential pressure within said container.

2. A liquid storage container comprising, in combination: a vessel for containing a liquid, said vessel having an open upper end and being formed peripherally about said upper end with an upwardly-open trough, a cover for overlying and enclosing said upper end, said cover being formed with a reverse-bend cylindrical flange arranged to extend about the periphery of said open end and downwardly into said trough, said cover terminating outwardly of said cylindrical flange in a radial flange for completing the enclosure of said trough, and a mass of dilatant silicone putty disposed in said trough for submersion of said peripheral flange of said cover therein, said mass of silicone putty being characterized by flowing under quiescent conditions into complete and wetting contact with said cover flange, and becoming of increased resistance to flow and stiffness when subjected to force, thereby providing a liquid seal about said cover which stiffens to withstand sudden fluctuations in the differential pressure within said container.

3. A liquid storage container comprising in combination: a vessel for containing a liquid, said vessel having an open upper end and being formed peripherally about said upper end with bent portions including downwardly and upwardly-extending flanges spaced apart by a connecting flange to form an upwardly-open trough therebetween, a cover for overlying and enclosing said upper end, said cover being formed with a peripheral flange arranged to extend about the periphery of said open end and downwardly into said trough, and a mass of dilatant silicone putty disposed in said trough for submersion of said peripheral flange of said cover therein, said mass of silicone putty being characterized by flowing under quiescent conditions into complete and wetting contact with said cover flange, and becoming of increased resistance to flow and stiffness when subjected to force, thereby providing a liquid seal about said cover which stiffens to withstand sudden fluctuations in the differential pressure within said container.

4. In a fluid containing system, a fluid-tight seal comprising means defining a conduit having ascending and descending portions joining at a trough and separated by partitioning means extending downwardly into said trough, and a mass of dilatant silicone putty within said trough to at least the level of said partitioning means, said mass of silicone putty being characterized by flowing under quiescent conditions into complete and wetting contact with said partitioning means, and becoming of increased resistance to flow and stiffness when subjected to force, thereby providing a liquid seal in said conduit which stiffens to withstand sudden fluctuations in the differential pressure across said conduit.

References Cited by the Examiner
UNITED STATES PATENTS

| | | |
|---|---|---|
| 2,541,851 | 2/51 | Wright. |
| 2,644,805 | 7/53 | Martin _____ 260—46.5 |
| 3,008,913 | 11/61 | Pangonis _____ 260—46.5 |

FOREIGN PATENTS

| | | |
|---|---|---|
| 933,466 | 1/48 | France. |
| 42,019 | 2/17 | Sweden. |

THERON E. CONDON, *Primary Examiner.*

EARLE J. DRUMMOND, GEORGE O. RALSTON,
*Examiners.*